Patented July 10, 1923.

1,461,117

UNITED STATES PATENT OFFICE.

ROY D. HALL, OF EAST ORANGE, AND HARRY H. SMITH, OF NEWARK, NEW JERSEY, ASSIGNORS TO WESTINGHOUSE LAMP COMPANY, A CORPORATION OF PENNSYLVANIA.

FILAMENTARY BODY FOR ELECTRIC LAMPS AND METHOD OF MAKING THE SAME.

No Drawing.    Application filed December 19, 1917.    Serial No. 207,837.

*To all whom it may concern:*

Be it known that we, ROY D. HALL, a citizen of the United States, and a resident of East Orange, in the county of Essex and State of New Jersey, and HARRY H. SMITH, a citizen of the United States, and a resident of Newark, in the county of Essex and State of New Jersey, have invented a new and useful Improvement in Filamentary Bodies for Electric Lamps and Methods of Making the Same, of which the following is a specification.

Our invention relates to filaments for incandescent lamps, and more particularly to filaments made from a highly refractory material, such as tungsten. The object of our invention is to produce a metallic filamentary material composed of a base having added thereto auxiliary ingredients, which render the resultant substance capable of responding to a seasoning schedule intended to produce a crystalline structure having a characteristic formation, and treating the filamentary material in accordance with a predetermined heat treating schedule.

A heat treating schedule is disclosed by Harry H. Smith in an application filed December 19, 1917, Serial No. 207,851 which contemplates the inducing or formation of a crystalline structure possessing substantially non-sagging properties and this schedule is especially suitable for the treatment of a filament composed of certain constituents, such as clearly set forth in an application by R. D. Hall, filed December 19, 1917, Serial No. 207,838. In accordance with this invention, it is proposed to apply this heat treating schedule to a similarly prepared filament which results in the production of a filamentary material having large inter-lacing crystals capable of successfully resisting internal alterations such as is manifested by sagging.

In keeping with the above statements, our invention contemplates the addition of certain crystal growth resisting auxiliary ingredients to the tungsten comprising a filament base that will impart to the latter, such inherent characteristics as to make it responsive to a seasoning schedule designed to produce a given crystalline formation. The auxiliary ingredients especially adapted for this purpose are some oxygen containing compound of the rare earth metals, such as thoria, alumina, etc., that is, non-reducible in hydrogen and substantially non-volatile, and combine it with another oxide that becomes more or less volatile at high temperatures, such as silica. The oxides of these auxiliary substances have the effect of retarding grain growth and preventing the formation of very fine grains. It appears essential that a considerable quantity of the auxiliary substances mentioned is present at the start of the forming of the tungsten powder into a rod or ingot, according to the processes practiced in producing ductile tungsten, in order to obtain proper control of the inherent properties desired to be imparted to a filament, so as to make it susceptible to a predetermined seasoning schedule which will induce the formation of a given crystalline structure. The silica is of such a consistency as to be volatile at a high temperature relative to the temperatures employed in the working of tungsten during the formation of the tungsten powder into a filament. As specifically set forth in the Hall application referred to above, the quantity of silica and thoria which may be mixed together and produce a highly satisfactory filamentary material for the purpose of this invention, is from 2% to 7% by volume of the silica and from 1–4 tenths per cent by volume of thoria. In case alumina is used the proportions are 1% to 5% by volume of alumina and that of silica, 2% to 7% by volume.

A filamentary material resulting from an intimate mixture of the ingredients specified, possesses the quality of being highly susceptible to treatment in accordance with a predetermined heat treating schedule. Very good results are obtained in producing a non-sag crystalline structure in this special form of filamentary material by subjecting it in a reducing atmosphere to the following schedule; apply a current of 90% of the rating for which the lamp is designed, gradually increase this current until it reaches 130% at the end of one minute's time and then maintain this latter current strength for a period of one minute, after which time it is interrupted. This schedule has been found to give very satisfactory results for all tungsten gas filled lamps above 100 watts, but it is obvious that it is subject to modification in treating different type lamps which may have different type filaments. If a filamentary material composed of the substances enumerated above has received the treatment just described, is examined under the microscope, it will be seen to possess a crystalline structure in which all of the grains are of large size and of a particular formation, i. e., crystals of considerable length which inter-lace with each other. When a filament made from this material is embodied in a lamp and life tested, it will be found to have a non-sagging quality or property which is very dependable, and can be relied upon to such a degree so as to warrant the manufacturer in guaranteeing the non-sagging properties of the filament.

While we have designated the treatment of a filament comprised of certain substances, and set forth a heat treating schedule especially applicable to this form of a filament, our invention in its broadest aspect contemplates the application or adaptation of a seasoning schedule to a filamentary material, so composed as to be inherently responsive to a given seasoning schedule which is designed to produce a predetermined characteristic crystalline formation.

What we claim as our invention is:

1. A filament for electric incandescent lamps or other devices, composed primarily of tungsten and made up mainly of a number of large crystals so interrelated as to be capable of preventing substantial sagging and offsetting during a normal or commercially useful life for such a lamp or other device.

2. A filament for electric incandescent lamps or other devices, composed primarily of tungsten and made up of crystals of considerable length which interlace or overlap one another so as to prevent substantial sagging and offsetting during a normal or commercially useful life for such a lamp or other device.

3. A filament for electric incandescent lamps or other devices, composed primarily of tungsten and having a crystalline structure therein which renders the same resistant to sagging and offsetting, said structure being developed by heat-treating a filamentary body to which has been added, during its formation, auxiliary ingredients which render the same susceptible to such heat-treatment, said heat-treatment being in accordance with a predetermined schedule based upon the size of the filament.

4. A filament composed primarily of tungsten and having a crystalline structure of large interrelated crystals, said structure being developed by heat-treating a filamentary body to which has been added, during its formation, auxiliary ingredients which render the same susceptible to such heat-treatment, said heat-treatment being in accordance with a predetermined schedule based upon the size of the filament.

5. The method of producing substantially non-sagging and non-offsetting filaments composed primarily of tungsten metal, which comprises conditioning the metal by the addition of auxiliary ingredients so as to render the same susceptible to crystal growth by heat-treatment, and then heat treating said metal to develop therein a crystalline structure which is capable of resisting internal alterations such as is manifested by sagging and offsetting.

6. The method of producing substantially non-sagging and non-offsetting filaments composed primarily of tungsten metal, which comprises conditioning the metal so as to render the same susceptible to a heat-treatment to produce an interrelated crystalline formation, and then heat-treating the metal in such manner as to develop said formation.

7. The method of producing substantially non-sagging and non-offsetting filaments composed primarily of tungsten metal, which comprises conditioning the metal so as to make it responsive to heat-treatment to develop an interrelated crystalline structure which will render the same resistant to sagging and offsetting, said conditioning consisting in adding to the metal during its fabrication into a filament, auxiliary ingredients, such as thoria and silica, and, after the formation of said material in the filamentary form, heat-treating the same in accordance with a predetermined schedule.

8. The method of producing substantially non-sagging and non-offsetting filaments composed primarily of tungsten, which comprises fabricating a filament of tungsten in accordance with well known methods after having previously introduced therein a compound or compounds containing a material which is substantially non-volatile and a crystal structure directing material which is volatile at the high temperatures prevailing during the fabrication of the metal into a filament and heat-treating said filament in accordance with a predetermined schedule.

9. A filament for electric incandescent lamps or other devices, composed primarily of tungsten and made up mainly of a number of large crystals so interrelated as to be capable of preventing substantial sagging during a normal or commercially useful life for such a lamp or other device.

10. A filament for electric incandescent lamps or other devices, composed primarily of tungsten and made up of crystals of considerable length which interlace or overlap one another so as to prevent substantial sagging during a normal or commercially useful life for such a lamp or other device.

In testimony whereof, we have hereunto subscribed our names this 5th day of Dec., 1917.

ROY D. HALL.
HARRY H. SMITH.